US012665231B2

(12) United States Patent
Han et al.

(10) Patent No.:  US 12,665,231 B2
(45) Date of Patent:       Jun. 23, 2026

(54) END PLATE ASSEMBLY INCLUDING THERMISTOR, BATTERY MODULE AND BATTERY PACK INCLUDING THE SAME

(71) Applicant: SK ON CO., LTD., Seoul (KR)

(72) Inventors: Jin Su Han, Daejeon (KR); Ji Eun Kang, Daejeon (KR); Min Song Kang, Daejeon (KR); Ju Yong Park, Daejeon (KR); Suk Ho Shin, Daejeon (KR); Ji Woong Kim, Daejeon (KR); Byeong Jun Pak, Daejeon (KR)

(73) Assignee: SK On Co., Ltd., Seoul (KR)

( * ) Notice: Subject to any disclaimer, the term of this patent is extended or adjusted under 35 U.S.C. 154(b) by 577 days.

(21) Appl. No.: 18/175,547

(22) Filed: Feb. 28, 2023

(65) Prior Publication Data

US 2023/0291022 A1     Sep. 14, 2023

(30) Foreign Application Priority Data

Mar. 14, 2022     (KR) ........................ 10-2022-0031552

(51) Int. Cl.
| | |
|---|---|
| *H01M 10/48* | (2006.01) |
| *H01M 10/42* | (2006.01) |
| *H01M 50/276* | (2021.01) |
| *H01M 50/505* | (2021.01) |

(52) U.S. Cl.
CPC ....... *H01M 10/486* (2013.01); *H01M 10/425* (2013.01); *H01M 50/276* (2021.01); *H01M 50/505* (2021.01); *H01M 2010/4278* (2013.01)

(58) Field of Classification Search
CPC ............. H01M 10/425; H01M 10/486; H01M 2010/4278; H01M 50/204; H01M 50/276; H01M 50/505; H01M 50/569; Y02E 60/10
See application file for complete search history.

(56) References Cited

U.S. PATENT DOCUMENTS

| | | | |
|---|---|---|---|
| 9,666,378 B2 | 5/2017 | Hayashida et al. | |
| 2012/0052359 A1* | 3/2012 | Yoshitake | H01M 50/264 |
| | | | 429/120 |
| 2012/0064386 A1 | 3/2012 | Oguri et al. | |
| 2013/0164569 A1* | 6/2013 | Srinivasan | H01M 10/486 |
| | | | 429/7 |
| 2015/0147613 A1 | 5/2015 | Hayashida et al. | |

(Continued)

FOREIGN PATENT DOCUMENTS

| | | | | |
|---|---|---|---|---|
| CN | 215644726 U | 1/2022 | | |
| EP | 3770994 A1 * | 1/2021 | ............ | H01M 50/20 |

(Continued)

OTHER PUBLICATIONS

Third Party Observation for the European Patent Application No. 23160840.7 issued by the European Patent Office on Nov. 15, 2023.

(Continued)

*Primary Examiner* — Victoria H Lynch

(74) *Attorney, Agent, or Firm* — IP & T GROUP LLP

(57) ABSTRACT

A battery module includes a plurality of battery cells stacked in one direction; and an end plate assembly covering an outermost battery cell disposed on the outermost among the plurality of battery cells, wherein the end plate assembly includes at least one thermistor for measuring a temperature of the outermost battery cell.

11 Claims, 12 Drawing Sheets

100

(56)        References Cited

U.S. PATENT DOCUMENTS

| | | |
|---|---|---|
| 2021/0126314 A1 | 4/2021 | Masuda et al. |
| 2021/0218074 A1 | 7/2021 | Aoki et al. |
| 2021/0296714 A1 | 9/2021 | Yamashita et al. |
| 2022/0328890 A1 | 10/2022 | Aoki et al. |
| 2022/0359922 A1 | 11/2022 | Park |
| 2023/0043819 A1* | 2/2023 | Oh ...................... H01M 50/271 |
| 2023/0071238 A1 | 3/2023 | Hwang |

FOREIGN PATENT DOCUMENTS

| | | |
|---|---|---|
| KR | 10-2020-0030967 A | 3/2020 |
| KR | 10-2020-0103465 A | 9/2020 |
| KR | 10-2021-0103832 A | 8/2021 |
| KR | 10-2021-0145338 A | 12/2021 |
| WO | 2013/179798 A1 | 12/2013 |
| WO | 2021166427 A1 | 8/2021 |
| WO | 2021246633 A1 | 12/2021 |

OTHER PUBLICATIONS

Extended European Search Report on the European Patent Application No. 23160840.7 issued by the European Patent Office on Jul. 10, 2023.

Office Action for Korean Patent Application No. 10-2022-0031552 issued by the Korean Patent Office on Mar. 10, 2026.

* cited by examiner

II - II'

III-III'

III-III'

1231   1230     1240     1221
1220
1222
1210
111

V-V'

Battery Monitoring IC ↔ COMMUNICATION IC ↔ COMMUNICATION IC ↔ MCU

CMU                                    BMU

END PLATE ASSEMBLY INCLUDING THERMISTOR, BATTERY MODULE AND BATTERY PACK INCLUDING THE SAME

CROSS-REFERENCE TO RELATED APPLICATION(S)

This application claims benefit of priority to Korean Patent Application No. 10-2022-0031552 filed on Mar. 14, 2022 in the Korean Intellectual Property Office, the disclosure of which is incorporated herein by reference in its entirety.

BACKGROUND

1. Field

The present disclosure relates to an end plate assembly including a thermistor, a battery module including the same, and a battery pack.

2. Description of Related Art

A lithium secondary battery may be applied to fields requiring high energy, such as automobiles or power storage devices, in the form of a battery pack.

The secondary battery may include a plurality of battery cells, the plurality of battery cells may form an intermediate assembly such as a battery module, and the intermediate assemblies may form a battery pack.

A battery cell, which is the smallest unit of a secondary battery, may include an electrode assembly in which a plurality of electrodes are stacked. The electrode assembly may have a form in which negative electrode plates and positive electrode plates are alternately stacked, and a separator for insulating a negative electrode plate and a positive electrode plate from each other may be interposed between the negative electrode plate and the positive electrode plate.

Meanwhile, a short circuit may occur between electrodes included in the electrode assembly due to an external shock, which may lead to ignition of a battery cell, and may further cause chain ignition of other battery cells adjacent to the battery module. Fire occurring in the battery module may lead to fire in the entire battery pack.

For this reason, to prevent chain ignition of other battery cells and other battery modules, a means for effectively discharging flames or gases generated by battery cells may be necessary.

Meanwhile, ignition of the battery cell may be prevented in advance by measuring a maximum temperature of a battery cell separately from a means for discharging flame or gas generated by the battery cell.

However, since charge and discharge performance of a battery cell may tend to deteriorate at low temperature, to prevent ignition of the battery cell, it may be necessary to measure a maximum temperature and to measure a minimum temperature of the battery cell to maintain performance of the battery cell.

SUMMARY

An aspect of the present disclosure is to prevents ignition of battery cells and to maintain constant charge/discharge performance of battery cells regardless of external temperature.

According to an aspect of the present disclosure, an end plate assembly mounted on a battery module including a plurality of battery cells includes a first plate; and a second plate disposed on one side of the first plate and including at least one thermistor.

According to an aspect of the present disclosure, a battery module includes a plurality of battery cells stacked in one direction; and an end plate assembly covering an outermost battery cell disposed on the outermost among the plurality of battery cells, wherein the end plate assembly includes at least one thermistor for measuring a temperature of the outermost battery cell.

According to an aspect of the present disclosure, a battery pack includes a pack housing; a plurality of battery modules of one of claims 1 to 10 disposed in the pack housing; and a controller wirelessly communicating with the plurality of battery modules.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
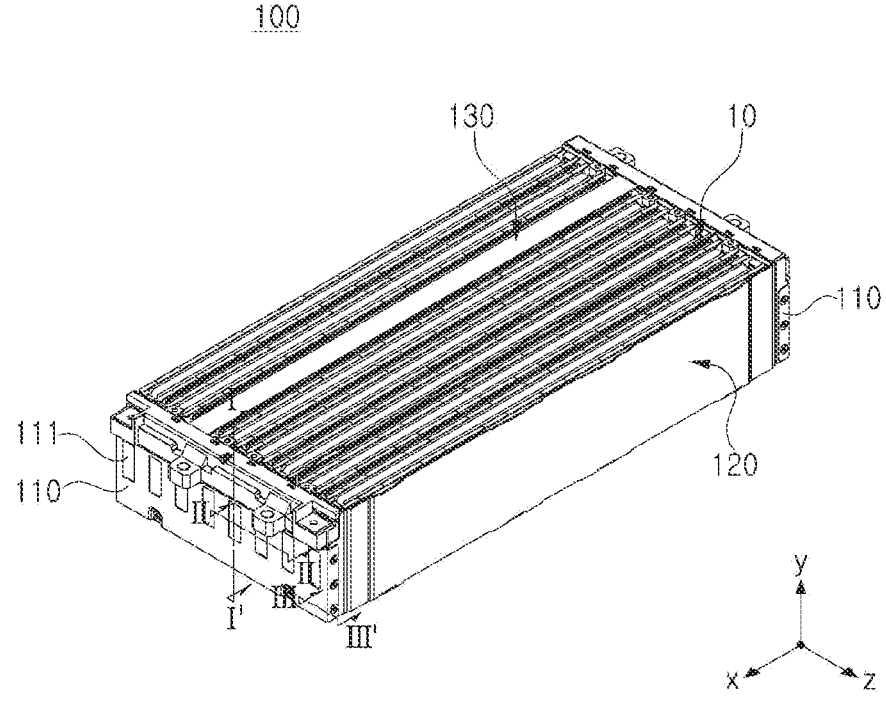
FIG. 1 is a perspective diagram illustrating a battery module according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided such that this disclosure will be thorough and complete, and will fully convey the scope of the disclosure to those skilled in the art. Accordingly, shapes and sizes of the elements in the drawings may be exaggerated for clarity of description. Also, elements having the same function within the scope of the same concept represented in the drawing of each example embodiment will be described using the same reference numeral.

In the drawings, same elements will be indicated by same reference numerals. Also, redundant descriptions and detailed descriptions of known functions and elements which may unnecessarily make the gist of the present disclosure obscure will not be provided. In the accompanying drawings, a portion of elements may be exaggerated, omitted or briefly illustrated, and the sizes of the elements do not necessarily reflect the actual sizes of these elements.

In example embodiments, terms such as an upper side (an upper portion), a lower side (a lower portion), a side surface, and the like, are represented based on the directions in the drawings, and may be used differently when the direction of an element is changed.

Figure 2:
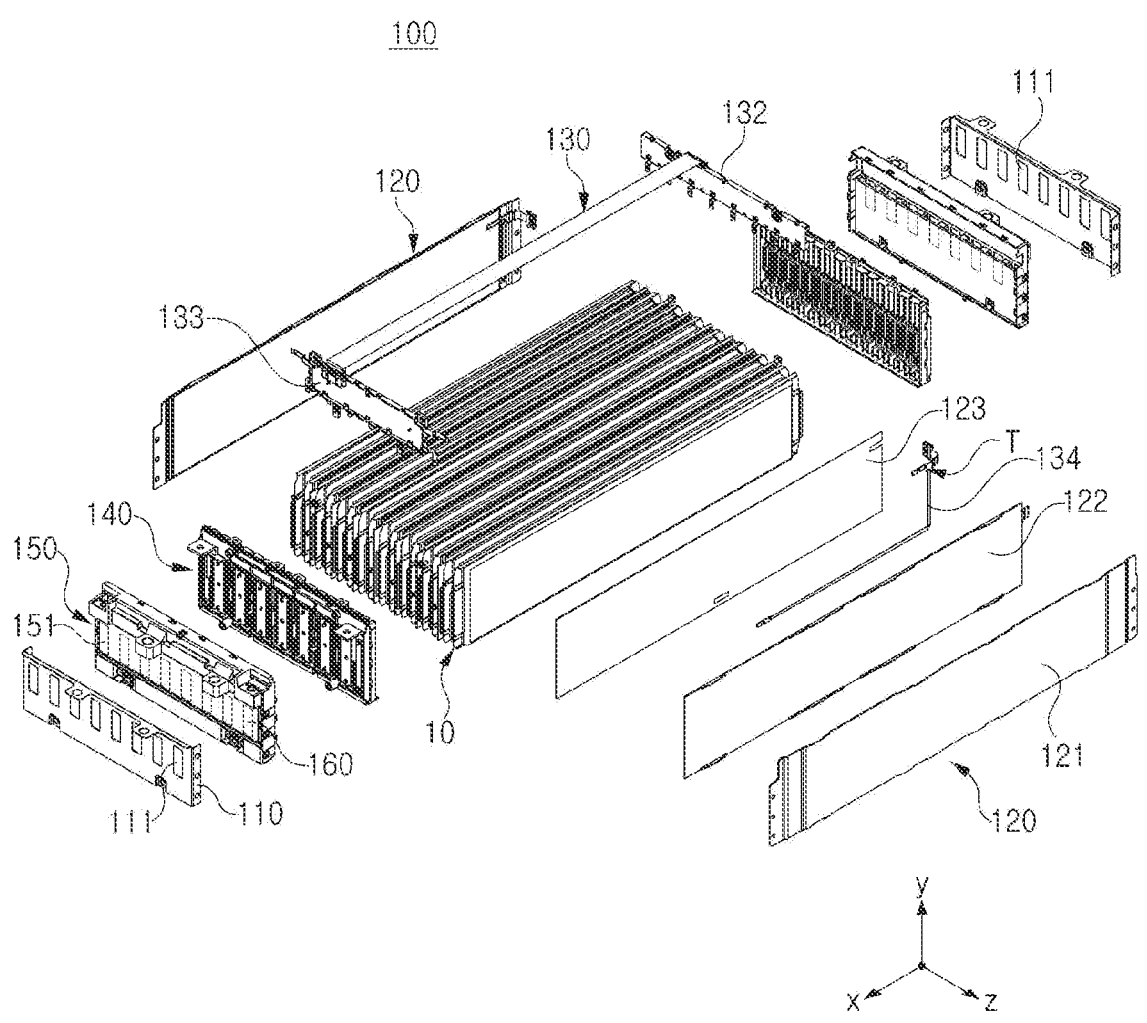
FIG. 2 is an exploded perspective diagram illustrating a battery module according to an example embodiment of the present disclosure.
Figure 3:
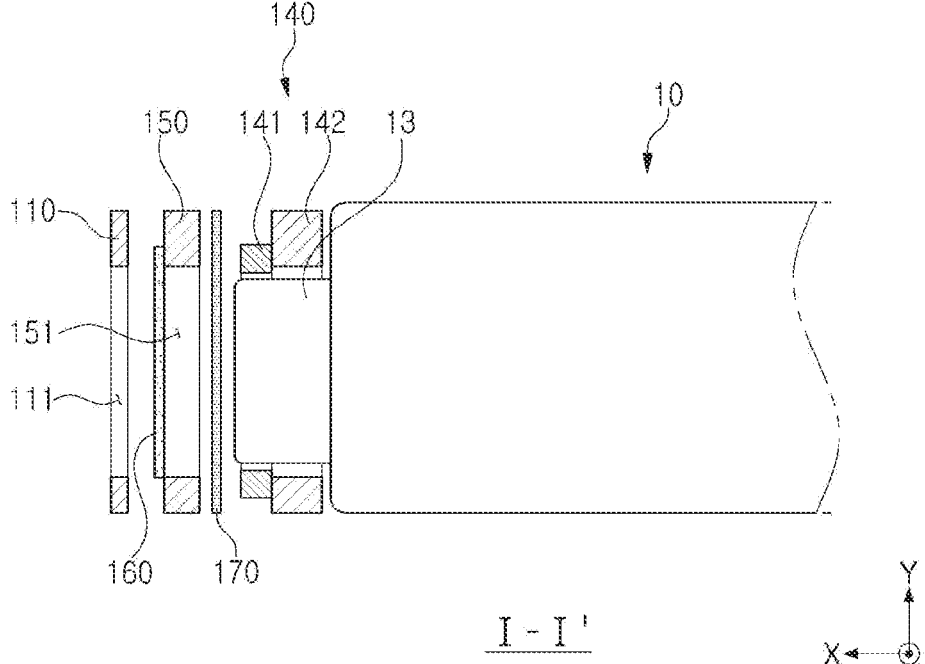
FIG. 3 is a cross-sectional diagram illustrating a battery module, taken along line I-I' in FIG. 1.
Figure 4:
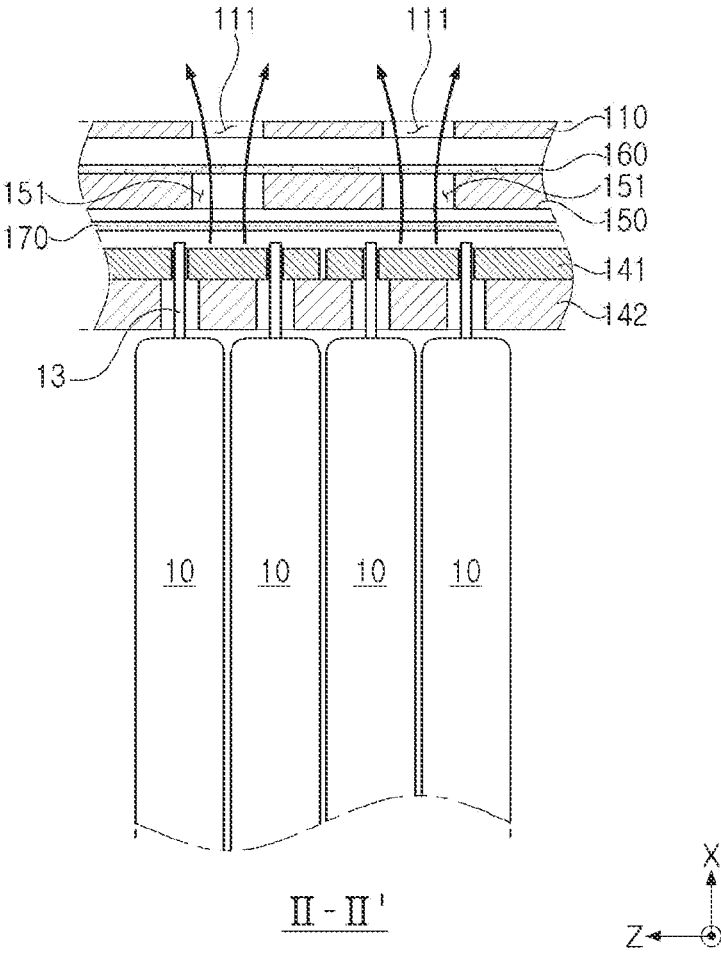
FIG. 4 is a cross-sectional diagram illustrating a battery module, taken along line II-II' in FIG. 1.
Figure 5:
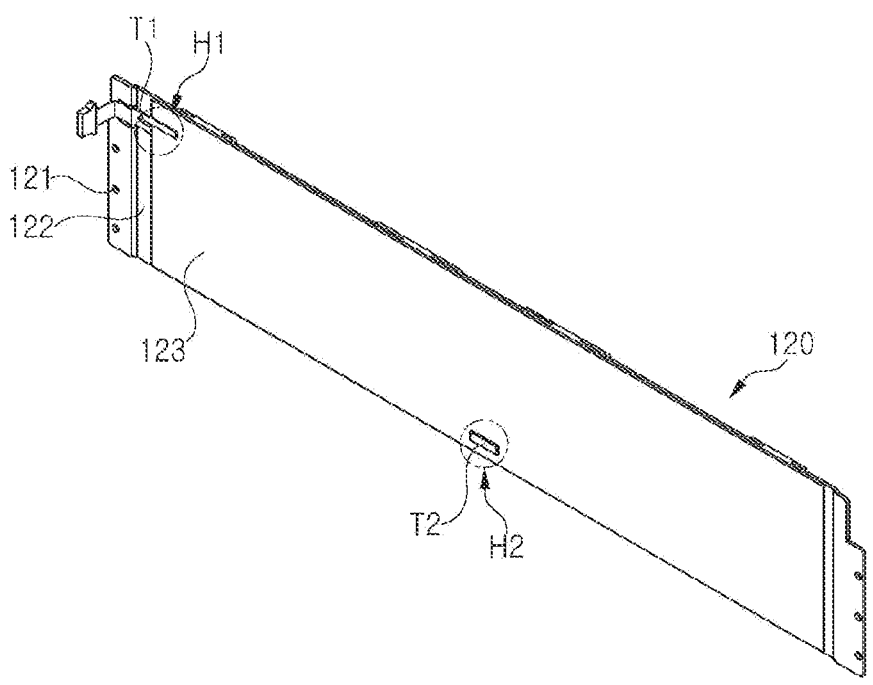
FIG. 5 is a perspective diagram illustrating an end plate assembly according to an example embodiment of the present disclosure.
Figure 9A:
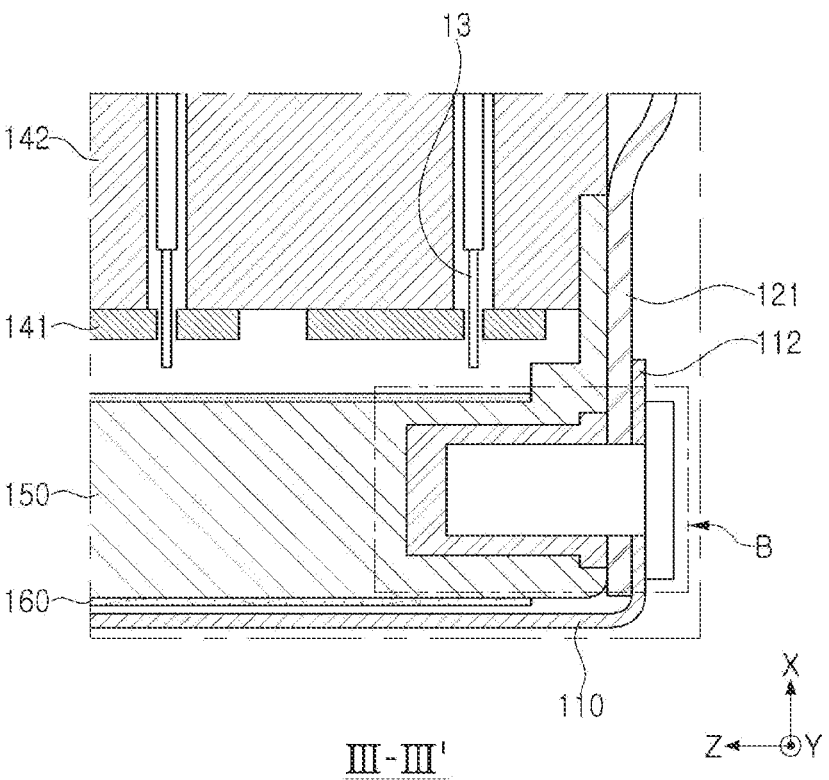
FIGS. 9A and 9B are cross-sectional diagrams illustrating a battery module, taken along line III-III' in FIG. 1.
Figure 9B:
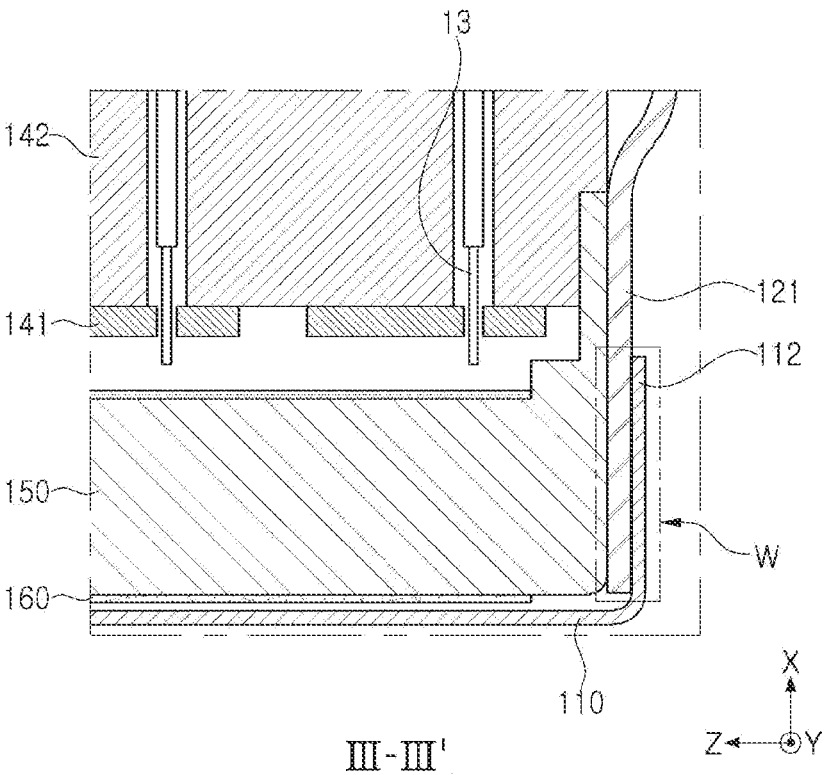

FIG. 1 is a perspective diagram illustrating a battery module according to an example embodiment. FIG. 2 is an exploded perspective diagram illustrating a battery module according to an example embodiment. FIG. 3 is a cross-sectional diagram illustrating a battery module, taken along line I-I' in FIG. 1. FIG. 4 is a cross-sectional diagram illustrating a battery module, taken along line II-II' in FIG. 1. FIG. 5 is a perspective diagram illustrating an end plate assembly according to an example embodiment. FIGS. 9A and 9B are cross-sectional diagrams illustrating a battery module, taken along line III-III' in FIG. 1.

Figure 6:
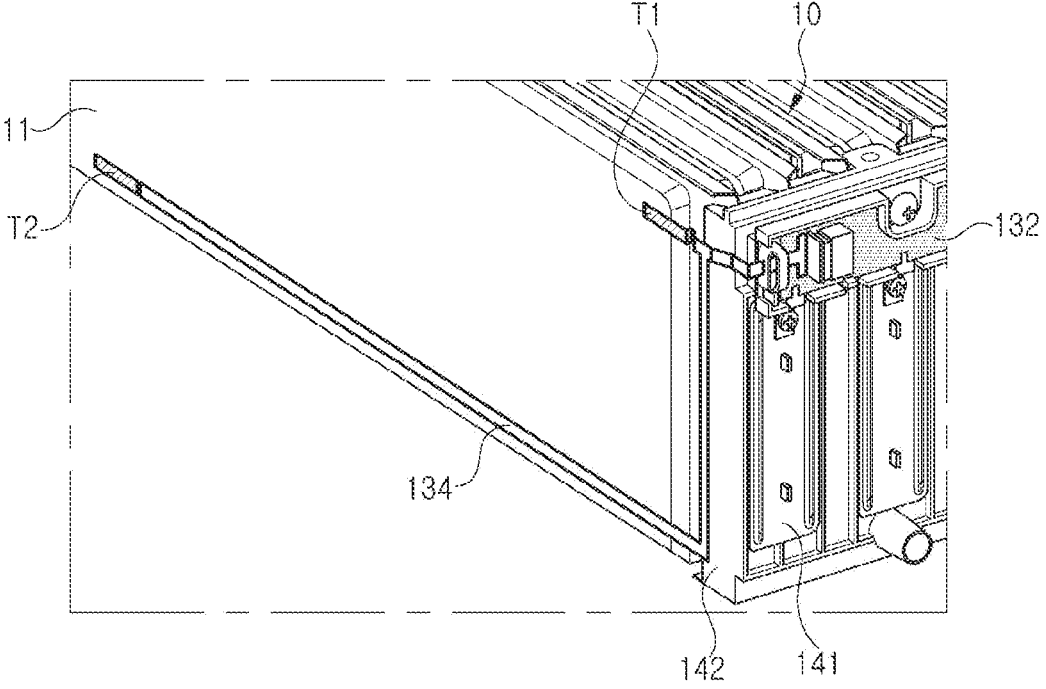
FIG. 6 is an enlarged diagram illustrating a portion to which a temperature sensor is applied in a battery module according to an example embodiment of the present disclosure.

FIG. 5 is a perspective diagram illustrating an end plate assembly according to an example embodiment. FIG. 6 is an enlarged diagram illustrating a portion to which a temperature sensor is applied in a battery module according to an example embodiment.

In an example embodiment, the battery module 100 may include a plurality of battery cells 10 and plates and plate assemblies 110 and 120 disposed to cover the plurality of battery cells 10 in a length direction and a stacking direction of the plurality of battery cells 10.

The battery cell 10 may include an electrode assembly in which a plurality of electrodes are stacked, and the battery module 100 may include a plurality of battery cells 10 stacked in one direction. Referring to FIG. 1, a plurality of battery cells 10 may be stacked in the Z-direction. Accordingly, in example embodiments, the Z-direction may refer to a stacking direction of the plurality of battery cells 10.

The battery cell 10 may include an electrode lead 13. The electrode lead 13 may be drawn out in the length direction of the battery cell 10. Referring to FIG. 1, a plurality of battery cells 10 may have a length in the X-direction. Accordingly, in example embodiments, the X-direction may refer to a length direction of the plurality of battery cells 10.

Referring to FIG. 1, the Y-direction may refer to a height direction of the plurality of battery cells 10. Also, with respect to the viewpoint of the battery module 100, the Y-direction may refer to a height direction of the battery module 100.

Referring to FIGS. 1 and 2, plates and plate assemblies may be disposed to cover the plurality of battery cells 10 in the stacking direction (Z-direction) and the length direction (X-direction) of the plurality of battery cells 10. Here, the plate and the plate assembly may refer to the side plate 110 and the end plate assembly 120 described later, respectively.

The plate and the plate assembly may bind a plurality of battery cells 10 as a single assembly. Also, it may be disposed on an external side of the plurality of battery cells 10 and may protect the plurality of battery cells 10.

To this end, the plate and the plate assembly may be formed of a material having high strength. For example, the plates and plate assemblies may be formed of a metal material such as aluminum, an aluminum alloy, or steel or may include components formed of such metal material.

The plate and the plate assembly may form the exterior of the battery module 100, and other components may be disposed between the plurality of battery cells 10 and the plate and the plate assembly, which will be described later.

A plurality of battery cells 10 may be at least partially covered by the plate and the plate assembly. Referring to FIGS. 1 and 2, two side surfaces of the plurality of battery cells 10 in the stacking direction (Z-direction) and two side surfaces in the length direction (X-direction) may be covered by the plate and the plate assembly.

Upper or lower portions of the plurality of battery cells 10 may be exposed to the outside. That is, a plate or plate assembly covering the plurality of battery cells 10 may not be provided in the height direction (Y-direction) of the plurality of battery cells 10. However, this is merely an example embodiment, and in another example embodiment, the plurality of battery cells 10 and a sensing module assembly may be protected from the outside by covering the upper portion of the battery module with a plate.

The plate and the plate assemblies 110 and 120 may include a side plate 110 disposed in the length direction (X-direction) of the plurality of battery cells 10 and an end plate assembly 120 disposed in the stacking direction (Z-direction) of the plurality of battery cells 10.

The side plate 110 may be disposed in the length direction (X-direction) of the plurality of battery cells 10. In other words, the side plate 110 may be disposed in a direction in which the electrode lead 13 of the battery cell 10 is drawn out.

The side plate 110 may include a plurality of venting holes 111. The venting hole 111 may communicate with a venting guide 151 formed in the insulating cover 150, and may work as a flow path through which gas or flame generated in the battery cell 10 is discharged to the outside.

The end plate assembly 120 may be disposed in a stacking direction (Z-direction) of the plurality of battery cells 10. That is, the end plate assembly 120 may be disposed to oppose the wide surface of the battery cell 10. The end plate assembly 120 may cover the outermost battery cells (hereinafter, referred to as outermost battery cells 11) with respect to the stacking direction (Z-direction) of the plurality of battery cells 10.

Referring to FIGS. 2 and 5, the end plate assembly 120 may include a plurality of plates. Specifically, the end plate assembly 120 may include a first plate 121 and a second plate 122, and may optionally further include a third plate 123.

The first plate 121 may be disposed on the outermost side in the stacking direction (Z-direction) of the plurality of battery cells 10 and may form the exterior of the battery module 100. The first plate 121 may be formed of a metal material such as aluminum, aluminum alloy, or steel to secure rigidity.

The second plate 122 may be disposed on one side of the first plate 121. Since the first plate 121 forms the exterior of the battery module 100, the second plate 122 may be disposed in the first plate 121.

When the end plate assembly 120 only consists of the first plate 121 and the second plate 122, the second plate 122 may be disposed between the first plate 121 and the outermost battery cell 11.

The second plate 122 may be formed of an insulating material such as plastic, and may insulate the plurality of battery cells 10 and the first plate 121 from each other.

The second plate 122 may be manufactured separately from the first plate 121 and may be attached to a surface of the first plate 121 oriented to the plurality of battery cells 10. Alternatively, the second plate 122 may be integrally manufactured with the first plate 121 through double injection.

The end plate assembly 120 may be manufactured in the form of a sandwich panel. For example, the second plate 122 is provided with a plurality of layers, and the second plate 122 may include a layer formed of a heat-resistant and fire-resistant material, for example, a mica material. In this case, the first plate 121 may be disposed on one surface of the second plate 122 oriented to the outside of the battery module 100. That is, the first plate 121 and the second plate 122 in the form of a sandwich panel may be disposed in order from the external side to the internal side of the battery module 100.

The end plate assembly 120 may further include a third plate 123. The third plate 123 may not be necessarily provided and may be provided selectively.

The third plate 123 may be disposed in the second plate 122. When the end plate assembly 120 includes the third plate 123, the third plate 123 may be disposed between the second plate 122 and the outermost battery cell 11.

The third plate 123 may be formed of an elastic material. The third plate 123 may be an elastic plate or an elastic pad, and may fill an empty space between the battery cell 10 and the second plate 122. For example, the third plate 123 may be formed of various foam materials.

The third plate 123 may be manufactured separately from the first plate 121 and the second plate 122. Alternatively, the first plate 121, the second plate 122, and the third plate 123 may be integrally manufactured.

Referring to FIG. 5, the first plate 121 may be formed longer in the length direction (X-direction) of the plurality of battery cells 10 than the second plate 122 and the third plate 123. Also, the second plate 122 may be formed longer than the third plate 123 in the length direction (X-direction) of the plurality of battery cells 10.

In an example embodiment, as illustrated in FIGS. 9A and 9B, the side plate 110 and the end plate assembly 120 may be coupled to each other.

The side plate 110 may include an extension portion 112 extending toward the end plate assembly 120 for coupling with the end plate assembly 120. The extension portion 112 may be configured to extend from both ends of the side plate 110 in the length direction toward the end plate assembly 120.

The side plate 110 may extend in the stacking direction (Z-direction) of the plurality of battery cells 10, and the end plate assembly 120 may extend in the length direction (X-direction) of the plurality of battery cells 10. Accordingly, the extension portion 112 of the side plate 110 may include a bent portion to extend toward the end plate assembly 120.

The extension portion 112 of the side plate 110 may extend toward the end plate assembly 120 and may cover a portion of the end plate assembly 120. A portion of the end plate assembly 120 covered by the extension portion 112 may be the first plate 121. As described above, since the first plate 121 is formed longer in the length direction (X-direction) of the plurality of battery cells 10 than the second plate 122 and the third plate 123, both ends of the end plate assembly 120 in the length direction may include a single plate, the first plate 121.

The side plate 110 and the end plate assembly 120 may be coupled to each other in the extension portion 112. That is, since the extension portion 112 of the side plate 110 covers a portion of the first plate 121, an overlapping portion may be formed, and the side plate 110 and the end plate assembly 120 may be coupled to each other in the overlapping portion. The side plate 110 and the end plate assembly 120 may have an overlap portion in the height direction (Y-direction) of the battery module 100 by the extension portion 112.

Also, since the extension portion 112 extends from both ends of the side plate 110 in the length direction, the side plate 110 may include four extension portions 112, and accordingly, the side plate 110 and the end plate assembly 120 may be coupled to each other in four positions.

For example, as illustrated in FIG. 9A, the side plate 110 and the end plate assembly 120 may be mutually coupled to each other by a bolting method B. Bolts may penetrate through the extension portion 112 and the first plate 121 in order and may be accommodated in a fastening groove of the insulating cover 150, and accordingly, the side plate 110 and the end plate assembly 120 may be mutually coupled to each other. Also, the side plate 110 and the end plate assembly 120 may be coupled by a bolting method B at a plurality of points of the extension portion 112 on the battery module 100 in the height direction (Y-direction).

As another example, as illustrated in FIG. 9B, the side plate 110 and the end plate assembly 120 may be coupled to each other by a welding method W. The side plate 110 and the end plate assembly 120 may be welded at a plurality of welding points of the extension portion 112 in the height direction (Y-direction) of the battery module 100.

In an example embodiment, the battery module 100 may further include a busbar assembly 140, an insulating cover 150, an insulating sheet 160, a heat resistant sheet 170 between the plurality of battery cells 10 and the side plate 110. That is, the busbar assembly 140, the insulating cover 150, the insulating sheet 160 and the heat resistant sheet 170 may be disposed in the length direction (X-direction) of the plurality of battery cells 10.

The busbar assembly 140 may be electrically connected to the plurality of battery cells 10. The busbar assembly 140 may include at least one busbar 141 connected to the battery cell 10 and an insulating plate 142 on which the busbar is disposed.

The busbar 141 may electrically connect two or more adjacent battery cells 10 to each other. For example, the electrode lead 13 drawn out from the battery cell 10 may be connected to the busbar 141, and accordingly, the battery cells 10 may be electrically connected to each other.

The insulating cover 150 may be disposed to cover the busbar assembly 140. The insulating cover 150 may be disposed between the side plate 110 and the plurality of battery cells 10 and may insulate the side plate 110 from the plurality of battery cells 10.

The insulating cover 150 may include a venting guide 151. The venting guide 151 may be configured to discharge flame or gas generated by the battery cell 10 on one side of the insulating cover 150 to a desired direction or position. For example, referring to FIGS. 2 to 4, the venting guide 151 may be open in the length direction (X-direction) of the plurality of cells 10, and accordingly, flames or gases generated by the battery cells 10 may be discharged in the length direction (X-direction), rather than being discharged in the height direction (Y-direction) or the stacking direction (Z-direction).

The venting guide 151 may be configured to be open in a direction opposing the plurality of battery cells 10, and may also be configured to be open in a direction in which the electrode lead 13 is drawn out.

Since sealing strength of the exterior material surrounding the electrode assembly is relatively weak in the portion in which the electrode lead 131 is drawn out, gas or flame tends to be discharged in the direction in which the electrode lead 13 of the battery cell 10 is drawn out when the battery cell 10 is ignited. As the venting guide 151 is open in the withdrawal direction of the electrode lead 13, flame or gas may be effectively discharged to the outside of the battery module 100, which may prevent or delay chain ignition or thermal runaway of the plurality of battery cells 10.

The venting guide 151 may be configured in a structure which may be more easily damaged than other portions due to flame or gas ejected from the battery cell 10. For example, the venting guide 151 may be provided in the form of a hole penetrating the insulating cover 150.

However, the venting guide 151 may not be necessarily provided in the form of a hole penetrating the insulating cover 150, and may be formed to be vulnerable to heat or pressure than other portions such that the venting guide 151 may be first penetrated by gas or flame ejected from the battery cell 10 and the gas or flame may be discharged to the corresponding portion.

For example, the insulating cover 150 may include a portion having a thickness thinner than those of other portions, and the corresponding portion may function as the venting guide 151. In this case, the portion functioning as the venting guide 151 in the insulating cover 150 may be more easily melted by flame or high-temperature gas than other portions due to the thin thickness, and may provide a flow path through which flame or gas ejected from the battery cell 10 is discharged.

The insulating cover 150 may include a plurality of venting guides 151, and the venting guides 151 may be arranged in a stacking direction (Z-direction) of the plurality of battery cells 10 on the insulating cover 150. Also, the number of the venting guides 151 and the size thereof may vary.

The side plate 110 may include a venting hole 111 corresponding to the venting guide 151. The venting holes 111 may be arranged on the side plate 110 in a stacking direction (Z-direction) of the plurality of battery cells 10, and may be provided in a number corresponding to the number of the venting guides 151.

The insulation sheet 160 may be disposed on the insulating cover 150. That is, the insulation sheet 160 may be disposed between the side plate 110 and the insulating cover 150.

The insulation sheet 160 may be configured to block foreign substances from entering through the venting hole 111 from the outside of the battery module 100, and to not interfere with the discharge of flame or gas through the venting hole 111.

The insulation sheet 160 may be formed of a material which may be easily melted than the insulating cover 150 by flame or gas. For example, the insulation sheet 160 may be formed of a material such as polycarbonate (PC). Also, the insulation sheet 160 may be manufactured integrally with the insulating cover 150.

Also, a heat resistant sheet 170 may be disposed between the busbar assembly 140 and the insulating cover 150. The heat-resistant sheet 170 may prevent flames or gases discharged from a portion of venting guides 151 from flowing into other venting guides 151.

The heat-resistant sheet 170 may be formed of a material having excellent fire resistance, heat resistance or heat insulation. For example, the heat resistant sheet 170 may be formed of a ceramic fiber material.

In an example embodiment, the battery module 100 may optionally include an insulation sheet 160 and a heat resistant sheet 170. That is, at least one of the insulation sheet 160 and the heat resistant sheet 170 may not be provided.

In an example embodiment, the battery module 100 may include a thermistor T between the plurality of battery cells 10 and the end plate assembly 120.

The thermistor T may be integrally formed with the end plate assembly 120 and may be provided on the second plate 122. The thermistor T may be provided on an inner surface of the second plate 122, that is, on one surface oriented to the outermost battery cell 11. For example, the thermistor T may be attached to one surface of the second plate 122 through a tape or may be inserted into a groove formed in the second plate 122. When the thermistor T is inserted into a groove formed in the second plate 122, the second plate 122 may additionally undergo a process of forming grooves for disposing the thermistor T.

The structure in which the thermistor T is provided on the end plate assembly 120 as described above may have an advantage of reducing the effect on the plurality of battery cells 10.

Specifically, the plurality of battery cells 10 may have a swelling phenomenon in which the thickness increases in the direction of the wide surface due to internal gas generation due to design issues or repetitive charging and discharging. Accordingly, pressure acting in the corresponding direction may become non-uniform, such that reduction in the lifespan of the battery cell 10 or a side reaction which may reduce the lifespan may occur.

In this state, when the thermistor T having volume and rigidity is provided between the plurality of battery cells 10, uneven pressure may act in the direction of the wide surface of the battery cells 10, which may affect the lifespan of the plurality of battery cells 10.

When the thermistor T is provided in the outermost battery cell 11, the above-described effect may be relatively reduced.

When the end plate assembly 120 further includes the third plate 123, the third plate 123 may include a hole H1 and H2 in a position opposing the thermistor T on the second plate 122 such that the thermistor T may be exposed toward the outermost battery cell 11 side.

In an example embodiment, since the second plate 122 includes two thermistors T1 and T2, the third plate 123 may also include two holes H1 and H2.

The thermistor T may measure the temperature of the plurality of battery cells 10 including the outermost battery cell 11 to the outermost battery cell 11 in a state of being provided on the second plate 122, and to this end, the thermistor T may be in contact with the outermost battery cell 11.

The thermistor T may include a first thermistor T1 and a second thermistor T2. That is, a first thermistor T1 and a second thermistor T2 may be provided on the second plate 122, and the first thermistor T1 and the second thermistor T2 may be simultaneously in contact with the outermost battery cell 11. However, the first thermistor T1 and the second thermistor T2 may be in contact with different regions of the outermost battery cell 11.

Since the first thermistor T1 and the second thermistor T2 are configured to measure different temperatures, the first thermistor T1 and the second thermistor T2 may be in contact with regions having different temperature properties of the outermost battery cell 11, respectively.

Specifically, the first thermistor T1 may be disposed in a region in which the maximum temperature of the outermost battery cell 11 may be measured to cope with overheating of the battery module 100, and the second thermistor T2 may be disposed in a region in which the lowest temperature of the outermost battery cell 11 may be measured to prevent performance deterioration of the battery module 100 due to low temperature. To this end, the first thermistor T1 may be in contact with the first region of the outermost battery cell 11, and the second thermistor T2 may be in contact with the second region of the outermost battery cell 11.

The first region may have the highest average temperature in the outermost battery cell 11. The outermost battery cell 11 may have a temperature distribution internally, and when the outermost battery cell 11 is divided into a plurality of regions, a region having the highest average temperature may become the first region.

For example, referring to FIG. 6, the first region may be adjacent to a corner of the upper portion of the outermost battery cell 11, and the first thermistor T1 may be provided to be in contact with the outermost battery cell 11 adjacent to the edge of the upper portion of the outermost battery cell 11, and may measure the highest temperature of the plurality of battery cells 10 including the outermost battery cell 11.

The second region may be a region having the lowest average temperature in the outermost battery cell 11. The outermost battery cell 11 may have a temperature distribution internally, and when the outermost battery cell 11 is divided into a plurality of regions, a region having the lowest average temperature may become the second region.

For example, referring to FIG. 6, the second region may be adjacent to the lower central portion of the outermost battery cell 11, and the second thermistor T2 may be provided to be in contact with the outermost battery cell 11 adjacent to the lower central portion of the outermost battery cell 11 and may measure the lowest temperature of the plurality of battery cells 10 including the outermost battery cell 11.

Generally, since the battery module 100 is cooled by a water cooling method in the lower portion of the battery cell 10, the upper portion of the battery module 100 may exhibit relatively high-temperature properties and the lower portion may exhibit low-temperature properties. Accordingly, the first thermistor T1 may be attached to an upper portion of the outermost battery cell 11, and the second thermistor T2 may be attached to a lower portion of the outermost battery cell 11.

Accordingly, in the drawings, the first region in which the first thermistor T1 is disposed and the second region in which the second thermistor T2 is disposed may vary depending on the cooling position. That is, the first region and the second region may be determined according to temperature properties of the outermost battery cell 11 or the plurality of battery cells 10, and may not indicate specific positions.

In an example embodiment, the thermistor T may be provided as a negative temperature coefficient thermistor (NTC thermistor) which may measure temperature through resistance change. Accordingly, the thermistor T may be easily applied to a structure in which the plurality of battery cells 10 and the end plate assembly 120 are closely disposed, and may sensitively measure temperature changes, which may be advantageous.

Figure 7:
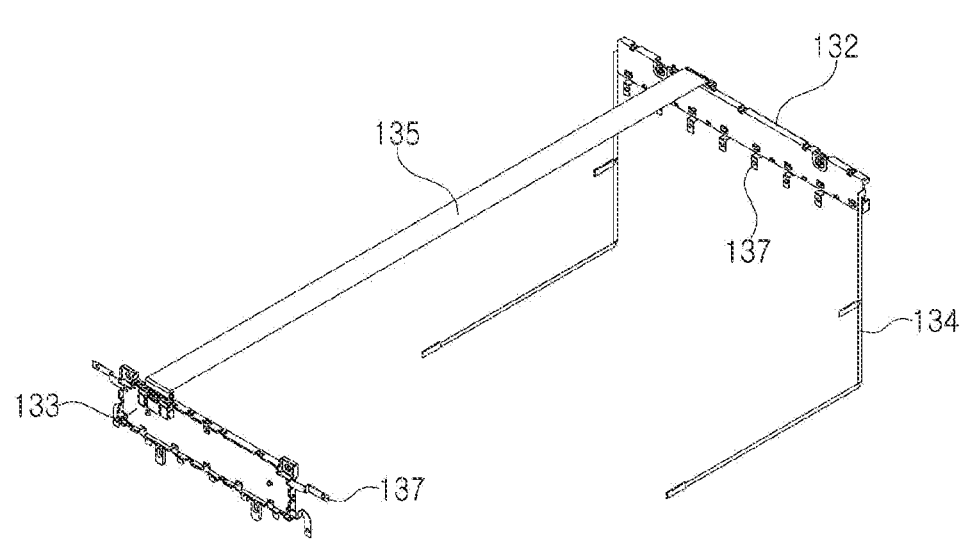
FIG. 7 is a perspective diagram illustrating a sensing module assembly of a battery module according to an example embodiment of the present disclosure.
Figure 8A:
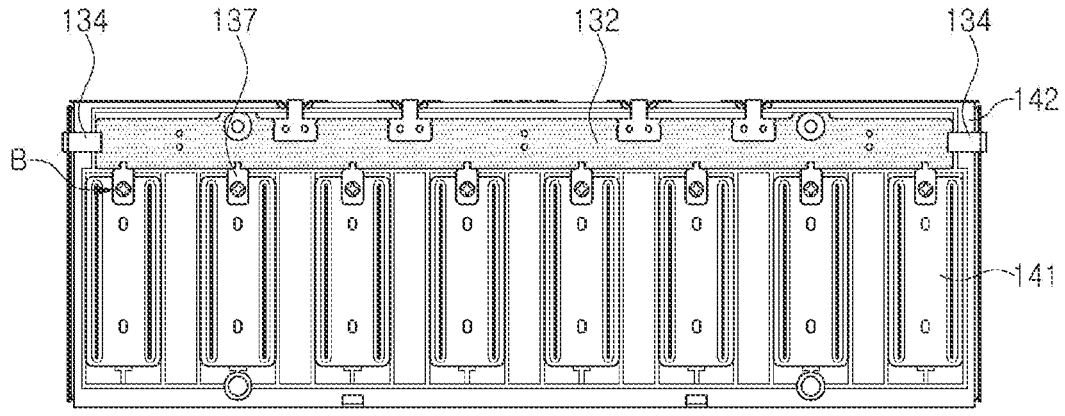
FIGS. 8A and 8B are diagrams illustrating a portion to which a sensing module assembly is coupled in a battery module according to an example embodiment of the present disclosure.
Figure 8B:
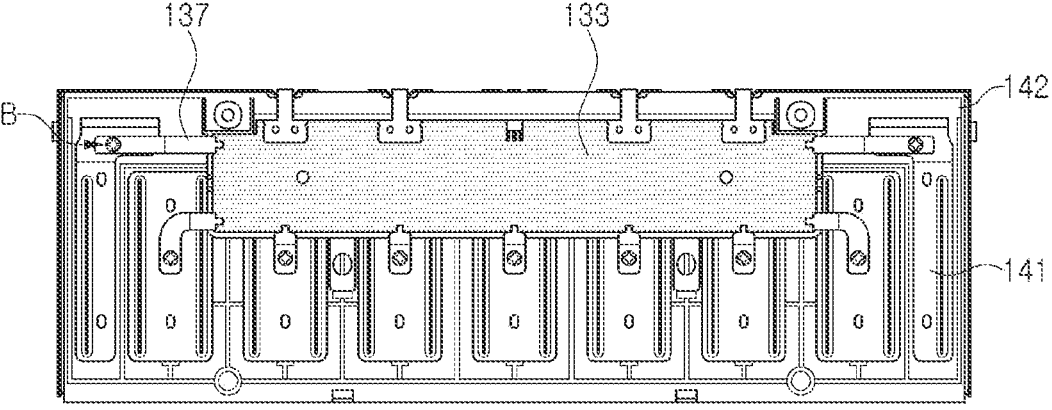

FIG. 7 is a perspective diagram illustrating a sensing module assembly of a battery module according to an example embodiment. FIGS. 8A and 8B are diagrams illustrating a portion to which a sensing module assembly is coupled in a battery module according to an example embodiment.

In an example embodiment, the battery module 100 may include a sensing module assembly (SMA) 130. Referring to FIG. 7, the sensing module assembly 130 may include a first substrate 132, a second substrate 133 and a connection substrate 135.

The first substrate 132 may be configured as a printed circuit board (PCB) or a flexible printed circuit board (FPCB) extending in a stacking direction (Z-direction) of the plurality of battery cells 10. The first substrate 132 may be provided on a base plate. The first substrate 132 may be disposed on one side of the plurality of battery cells 10 in the length direction (X-direction).

The first substrate 132 may be electrically connected to the thermistor T provided on the second plate 122. The first substrate 132 may be electrically connected to the entirety of thermistors T provided on the second plates 122 of the end plate assembly 120 disposed on both sides of the plurality of battery cells 10 in the stacking direction (Z-direction).

That is, the first substrate 132 may be electrically connected to the two first thermistors T1 and the two second thermistors T2, and accordingly, the first substrate 132 may receive data about temperatures of the plurality of battery cells 10 including at least the outermost battery cell 11. In the first substrate 132, temperature data of the plurality of battery cells 10 including each outermost battery cell 11 may be collected. In addition to temperature data, current and voltage data may be collected in the first substrate 132.

The first substrate 132 and the thermistor T may be connected to each other through a connector 134. For example, the connector 134 may be provided as a wire, and may be provided as a flexible printed circuit (FPC) type or a flexible flat cable (FFC) type in addition to a general wire. Also, the connector 134 may be directly soldered on the first board 132 or may be connected to the first board 132 through a separate connector.

The first substrate 132 may be disposed on one side of the plurality of battery cells 10 in the length direction (X-direction) and may be coupled to the busbar assembly 140. For example, as illustrated in FIG. 8A, the first board 132 may include a plurality of sensing terminals 137, and the plurality of sensing terminals 137 of the first board 132 may be coupled to the busbar 141 of the busbar assembly 140 through bolts.

The second substrate 133 may be implemented as a printed circuit board (PCB) or a flexible printed circuit board (FPCB) extending in a stacking direction (Z-direction) of the plurality of battery cells 10. The second substrate 133 may be provided on the base plate. The second substrate 133 may be disposed on the other side of the plurality of battery cells 10 in the length direction (X-direction). That is, the second substrate 133 may be spaced apart from the first substrate 132 in the length direction (X-direction) of the plurality of battery cells 10.

The first substrate 132 and the second substrate 133 may be structurally and electrically connected to each other through a connection substrate 135. To this end, the connection substrate 135 may be implemented as a flexible printed circuit board (FPCB) extending in the length direction (X-direction) of the plurality of battery cells 10.

The second substrate 133 may include a cell monitoring unit (CMU). The second substrate 133 may receive data such as the temperature of the outermost battery cells 11 from the first substrate 132, and may communicate with a controller (hereinafter, a battery monitoring unit (BMU)) of the battery pack 1000 to be described later. Specifically, the second board 133 may transfer data received from the first board 132 to the BMU of the battery pack 1000 and may receive a control signal from the BMU. The CMU on the second board 133 and the BMU on the battery pack may communicate wirelessly.

The sensing module assembly 130 may include a first substrate 132, a second substrate 133, and a connection substrate 135 in the drawings, but the second substrate 133 may be optionally provided. In this case, the first substrate 132 may perform the above-described function of the second substrate 133 while being connected to the thermistor T. Also, since the second substrate 133 is not provided, the connection substrate 135 may not be provided.

Figure 10:
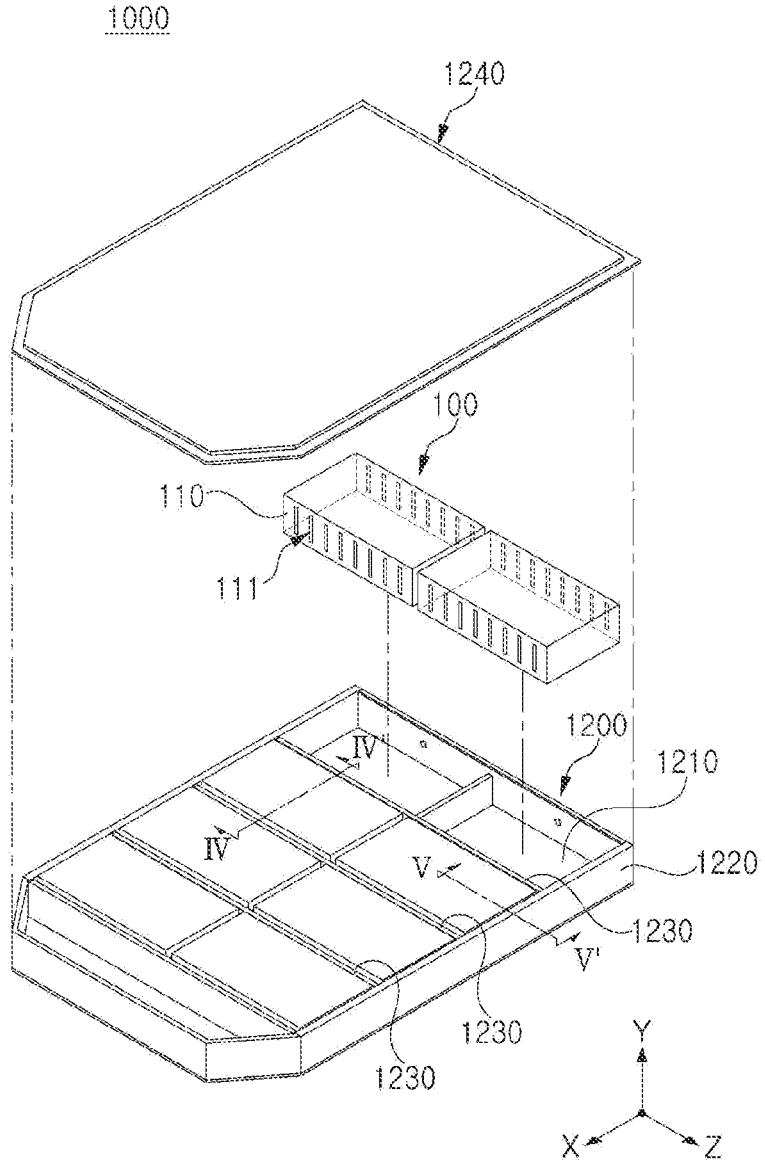
FIG. 10 is a perspective diagram illustrating a battery pack according to an example embodiment of the present disclosure.
Figures 11, 12:
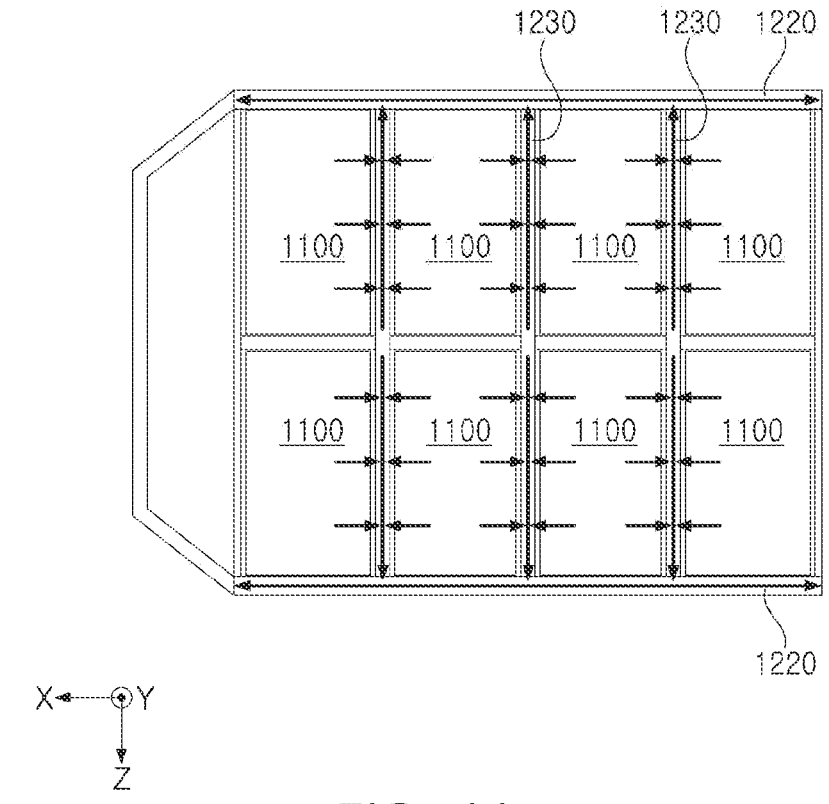
FIG. 11 is a diagram illustrating an internal flow path of the battery pack in FIG. 10.
FIG. 12 is a cross-sectional diagram illustrating a battery pack, taken along line IV-IV' in FIG. 10.
Figure 13:
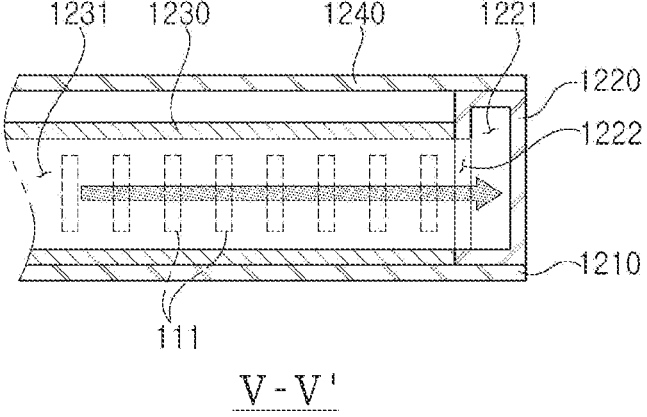
FIG. 13 is a cross-sectional diagram illustrating a battery pack, taken along line V-V' in FIG. 10.
Figure 14:
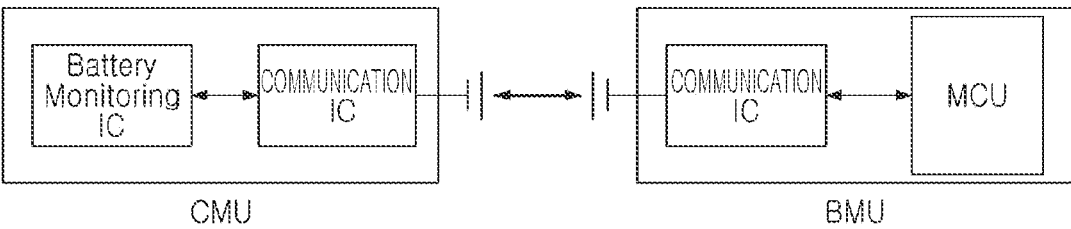
FIG. 14 is a block diagram illustrating communication between a controller of a battery pack and a battery module according to an example embodiment of the present disclosure.

FIG. 10 is a perspective diagram illustrating a battery pack according to an example embodiment. FIG. 11 is a diagram illustrating an internal flow path of the battery pack in FIG. 10. FIG. 12 is a cross-sectional diagram illustrating a battery pack, taken along line IV-IV' in FIG. 10. FIG. 13 is a cross-sectional diagram illustrating a battery pack, taken along line V-V' in FIG. 10. FIG. 14 is a block diagram illustrating communication between a controller of a battery pack and a battery module according to an example embodiment.

Referring to FIG. 10, a battery pack 1000 in an example embodiment may include a pack housing 1200 and a plurality of battery modules 100 disposed in the pack housing 1200.

The pack housing 1200 may include a lower plate 1210, a side frame 1220 extending from an edge of the lower plate 1210, and an upper plate 1240 covering the plurality of battery modules 100.

The plurality of battery modules 100 may be the battery module 100 described above, and may be a battery module 100 including the entirety or a portion of the components of the battery module 100 described above.

The battery modules 100 may include a venting hole 111, and the battery modules 100 may be disposed in the pack housing 1200 such that the venting hole 111 may be disposed in the X-direction in FIG. 10.

The pack housing 1200 may include a partition wall 1230 partitioning an internal space. At least one battery module 100 may be disposed in the space partitioned by the partition wall 1230. Referring to FIG. 11, flame or gas discharged from the battery module 100 may move into the side frame 1220 through the partition wall 1230. Flame or gas flowing in the side frame 1220 may be ejected to the outside of the battery pack 1000 through a hole provided in the pack housing.

Referring to FIGS. 11 and 12, flame or gas discharged from the battery cell 10 may be discharged through the venting guide 151 provided on the insulating cover 150 and the venting hole 1111 provided on the side plate 1110. The discharged flame or gas may flow into the first flow path 1231 provided by the partition wall 1230. The first flow path 1231 may extend in the length direction of the partition wall 1230.

The partition wall 1230 may form two or more first flow paths 1231 spatially separated from each other. One partition wall 1230 may be configured to form two or more first flow paths 1231 spatially separated through the structure.

Referring to FIG. 12, the partition wall 1230 may define first flow paths 1231 disposed on both sides of the partition wall 1230, respectively. For example, the partition wall 1230 may be provided in the form of a beam having an "I"-shaped cross section, and may define a flow path on each of both sides. However, the shape of the partition wall 1230 illustrated in FIG. 12 is an example, and the partition wall 1230 may have a different shape.

Referring to FIG. 13, the side frame 1220 may include a second flow path 1221. The second flow path 1221 may be connected to the first flow path 1231 of the partition wall 1230. The second flow path 1221 may include an inner space of the side frame 1220. For example, the side frame 1220 may be provided in a form of beam including an inner space, and may include a hole 1222 communicating the first flow path 1231 of the partition wall 1230 to the inner space. Gas or flame ejected from the venting hole 111 of the battery module 100 may primarily flow into the first flow path 1231 of the partition wall 1230, and gas or flame moving along the first flow path 1231 in the length direction of the partition wall 1230 may secondarily flow into the second flow path 1221 provided by the side frame 1220. Gas or flame flowing into the second flow path 1221 may be discharged out of the pack housing 1200 through an outlet provided in the pack housing 1200.

Also, the battery modules 100 may include a thermistor T and a sensing module assembly 130. The sensing module assembly 130 may be disposed in the X-direction in FIG. 10.

The sensing module assembly 130 may communicate with the battery pack 1000. In the battery modules 100, temperature data measured by the thermistor T may be collected in the substrate of the sensing module assembly 130, and such data may be transmitted to the battery pack 1000.

Referring to FIG. 14, the battery pack 1000 may include a controller. The controller may include a battery monitoring unit (BMU) including an MCU. The controller may communicate with each battery module 100 included in the battery pack 1000. That is, the controller may receive current and voltage data including temperature data of the sensing module assembly 130 of each battery module 100, specifically, the battery cell 10 of each battery module 100 from the second substrate 133 (or the first substrate 132), and may control each battery module 100 by transmitting a control signal to each battery module 100 based on the received data.

The battery modules 100 may control the current and/or voltage of the battery cell 10 based on the control signal transmitted from the controller such that the maximum temperature and the minimum temperature of the battery cell 10 may be maintained within a predetermined range.

The above-described process may be performed in a wired or wireless manner, preferably in a wireless manner.

Accordingly, ignition of the battery cell 10 may be prevented, charging and discharging performance of the battery cell 10 may be maintained regardless of external temperature, and stability and performance of the battery module 100 and the battery pack 1000 may be improved.

According to the aforementioned example embodiments, it may be possible to prepare for thermal runaway due to overheating of the battery cell and degradation of performance at low temperatures, and accordingly, stability and performance of the battery module and battery pack may be improved.

While the example embodiments have been illustrated and described above, it will be apparent to those skilled in the art that modifications and variations could be made without departing from the scope of the present disclosure as defined by the appended claims.

What is claimed is:

1. A battery module, comprising:

a plurality of battery cells stacked in one direction; and an end plate assembly covering an outermost battery cell disposed on the outermost among the plurality of battery cells, wherein the end plate assembly includes at least one thermistor for measuring a temperature of the outermost battery cell, wherein the end plate assembly is disposed to oppose a wide surface of the outermost battery cell, wherein the end plate assembly includes:

a first plate disposed on an outermost side; and a second plate disposed between the first plate and the outermost battery cell and includes the at least one thermistor on one surface facing the outermost battery cell, wherein the one surface is disposed to oppose the wide surface of the battery cell, and wherein the first plate and the second plate are manufactured in the form of a sandwich panel, wherein the at least one thermistor includes:

a first thermistor in contact with a first region of the outermost battery cell; and a second thermistor in contact with a second region of the outermost battery cell, wherein the first region has a highest average temperature in the outermost battery cell and is adjacent to an upper corner portion of the outermost battery cell and a busbar assembly electrically connected to the plurality of battery cells, and the second region has a lowest average temperature in the outermost battery cell.

2. The battery module of claim 1, wherein the end plate assembly further includes a third plate disposed between the second plate and the outermost battery cell, and wherein the third plate includes a hole in a position opposing the at least one thermistor such that the at least one thermistor is exposed toward the outermost battery cell.

3. The battery module of claim 1, further comprising:

a sensing module assembly disposed on one side of the plurality of battery cells in a length direction, and including a first substrate electrically connected to the at least one thermistor and receiving data on temperature of the outermost battery cell.

4. The battery module of claim 3, wherein the sensing module assembly further includes:

a second substrate disposed on the other side of the plurality of battery cells in a length direction; and a connection substrate extending in the length direction of the plurality of battery cells and structurally and electrically connecting the first substrate to the second substrate.

5. The battery module of claim 4, further comprising:

the busbar assembly disposed in the length direction of the plurality of battery cells and electrically connected to the plurality of battery cells, wherein the first substrate and the second substrate are coupled to the busbar assembly.

6. The battery module of claim 1, further comprising:

a side plate covering the plurality of battery cells in the length direction of the plurality of battery cells, wherein the side plate is coupled to the end plate assembly.

7. The battery module of claim 6, wherein the side plate includes an extension portion extending toward the end plate assembly and covering a portion of the end plate assembly, and wherein the side plate is coupled to the end plate assembly in the extension portion.

8. A battery pack, comprising:

a pack housing;

a plurality of battery modules disposed in the pack housing, wherein each of the plurality of battery modules comprises the battery module of claim 1; and a controller wirelessly communicating with the plurality of battery modules.

9. An end plate assembly mounted on a battery module including a plurality of battery cells, the end plate assembly comprising:

a first plate; and a second plate disposed on one side of the first plate and including at least one thermistor, wherein the second plate includes one surface disposed to oppose a wide surface of the plurality of battery cells, and wherein the at least one thermistor is disposed on the one surface, wherein the at least one thermistor includes:

a first thermistor in contact with a first region of an outermost battery cell; and a second thermistor in contact with a second region of the outermost battery cell, wherein the first region has a highest average temperature in the outermost battery cell and is adjacent to an upper corner portion of the outermost battery cell and a busbar assembly electrically connected to the plurality of battery cells, and wherein the second region has a lowest average temperature in the outermost battery cell.

10. The end plate assembly of claim 9, wherein the first plate is formed of a metal material, and the second plate is formed of an insulating material.

11. The end plate assembly of claim 9, further comprising:

a third plate disposed on one side of the second plate and formed of an elastic material, wherein the third plate includes a hole exposing the at least one thermistor in a position opposing the at least one thermistor of the second plate.

* * * * *